(12) United States Patent
Cesaroni

(10) Patent No.: US 11,105,417 B2
(45) Date of Patent: *Aug. 31, 2021

(54) TRACTION SYSTEM FOR HYBRID VEHICLES

(71) Applicant: Antonio Francisco Cesaroni, Loreggia (IT)

(72) Inventor: Antonio Francisco Cesaroni, Loreggia (IT)

(*) Notice: Subject to any disclaimer, the term of this patent is extended or adjusted under 35 U.S.C. 154(b) by 96 days.

This patent is subject to a terminal disclaimer.

(21) Appl. No.: 16/431,163

(22) Filed: Jun. 4, 2019

(65) Prior Publication Data

US 2019/0301597 A1    Oct. 3, 2019

Related U.S. Application Data

(63) Continuation-in-part of application No. 15/031,357, filed as application No. PCT/EP2014/072798 on Oct. 23, 2014, now Pat. No. 10,308,106.

(30) Foreign Application Priority Data

Oct. 23, 2013   (IT) ............................ PD2013A000292

(51) Int. Cl.
| | |
|---|---|
| *B60K 6/543* | (2007.10) |
| *F16H 61/00* | (2006.01) |
| *B60W 20/10* | (2016.01) |
| *F16H 57/04* | (2010.01) |
| *B60T 1/06* | (2006.01) |
| *B60W 50/00* | (2006.01) |

(52) U.S. Cl.
CPC .......... *F16H 61/0059* (2013.01); *B60T 1/062* (2013.01); *B60W 20/10* (2013.01); *F16H 57/0473* (2013.01); *B60W 2050/0003* (2013.01)

(58) Field of Classification Search
CPC ............. F16H 61/0059; F16H 57/0473; F16H 2015/386; F16H 2037/088; F16H 37/086; F16H 15/28; B60W 20/10; B60W 2050/0003; B60T 1/062; Y02T 10/62; B60K 6/48; B60K 6/365; B60K 6/543; B60K 2006/4808
See application file for complete search history.

(56) References Cited

U.S. PATENT DOCUMENTS

| | | | |
|---|---|---|---|
| 5,607,372 A * | 3/1997 | Lohr | ........................ F16H 15/38 |
| | | | 475/216 |
| 5,984,826 A | 11/1999 | Nakano | |
| 6,283,888 B1 | 9/2001 | Hirano | |
| 6,416,439 B1 | 7/2002 | Itoh et al. | |
| 10,308,106 B2 * | 6/2019 | Cesaroni | ............... F16H 37/021 |

(Continued)

FOREIGN PATENT DOCUMENTS

| | | |
|---|---|---|
| EP | 1061286 A1 | 12/2000 |
| GB | 415076 A1 | 8/1934 |

(Continued)

*Primary Examiner* — Justin Holmes
(74) *Attorney, Agent, or Firm* — Volpe Koenig

(57) ABSTRACT

A continuous speed variation device includes a input friction disc, a output friction disc, and at least three idle oscillating friction roller members. The input and output friction discs have a friction surface of toroidal shape and the idle oscillating roller members have a friction surface shaped in the form of a spherical dome.

17 Claims, 12 Drawing Sheets

(56) References Cited

U.S. PATENT DOCUMENTS

| | | | |
|---|---|---|---|
| 2001/0024987 A1* | 9/2001 | Ooyama | F16H 37/086 |
| | | | 475/207 |
| 2003/0195081 A1 | 10/2003 | Machida et al. | |
| 2004/0166984 A1 | 8/2004 | Inoue | |
| 2007/0149342 A1 | 6/2007 | Guenter et al. | |
| 2008/0076615 A1* | 3/2008 | Kim | B60K 6/365 |
| | | | 475/5 |
| 2011/0105273 A1 | 5/2011 | Tabuchi et al. | |
| 2011/0172051 A1 | 7/2011 | Hoffman | |
| 2012/0244991 A1* | 9/2012 | Shiina | F16H 15/52 |
| | | | 476/50 |

FOREIGN PATENT DOCUMENTS

| | | |
|---|---|---|
| WO | 2008095116 A2 | 8/2008 |
| WO | 2011092643 A1 | 8/2011 |

\* cited by examiner

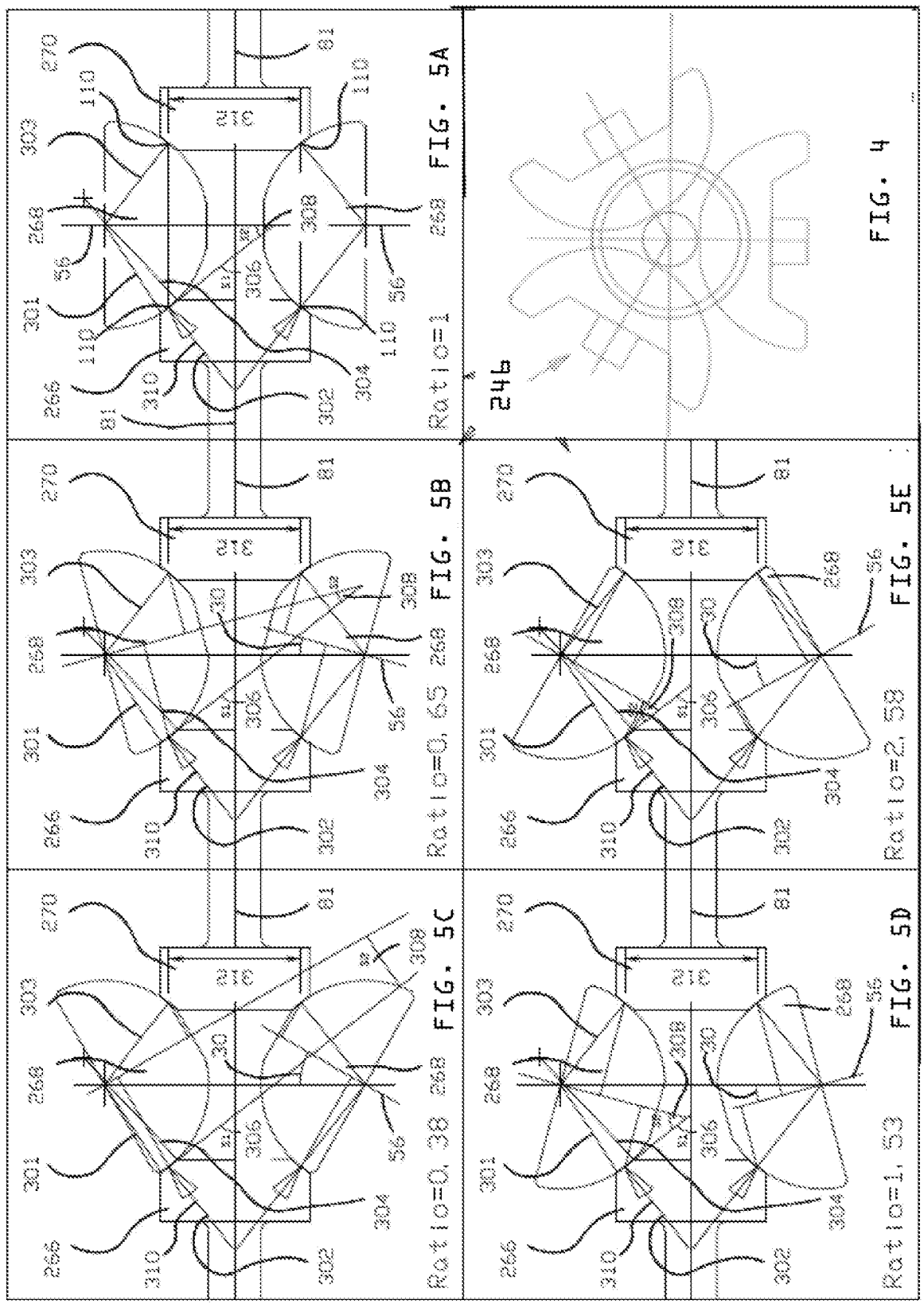

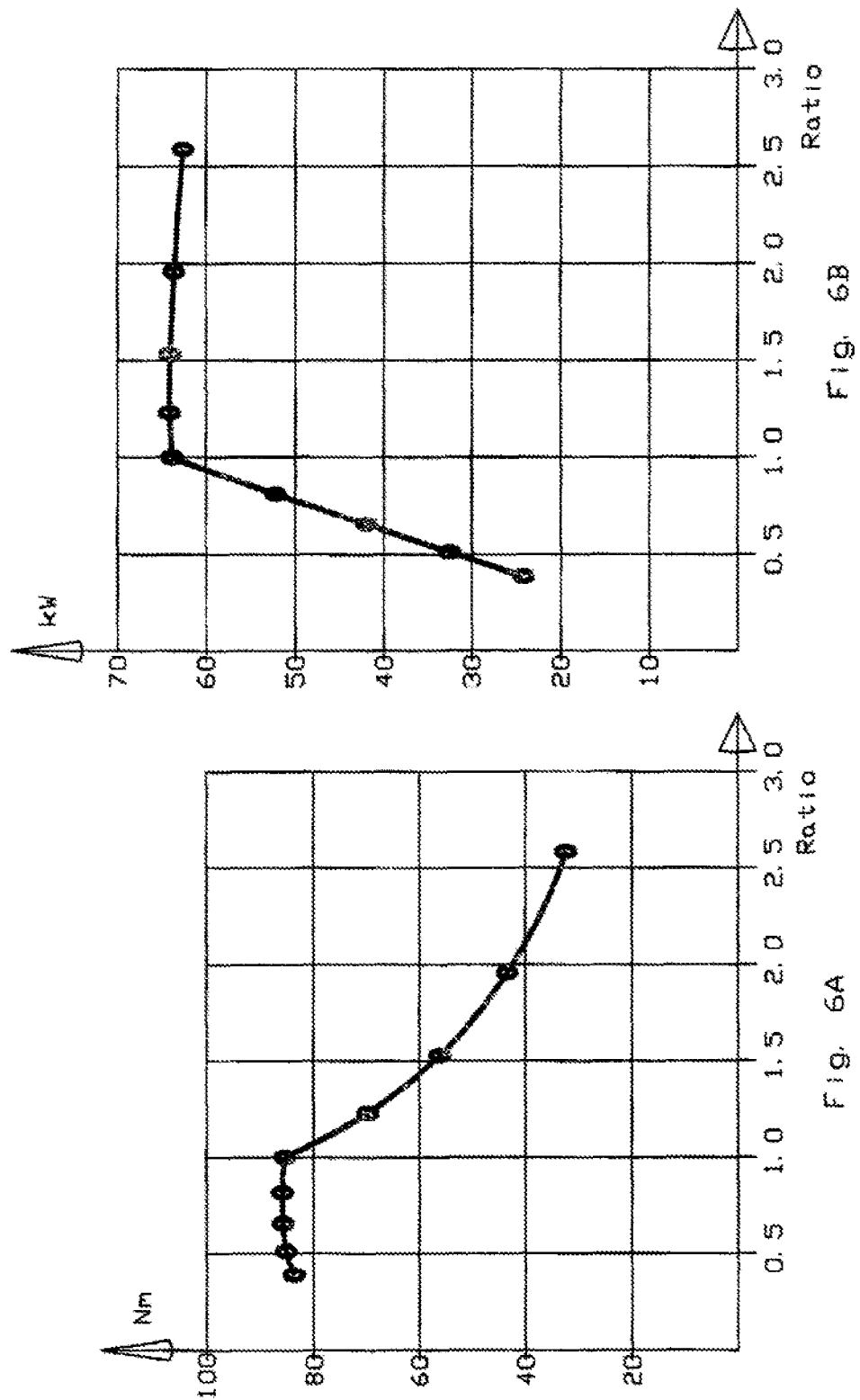

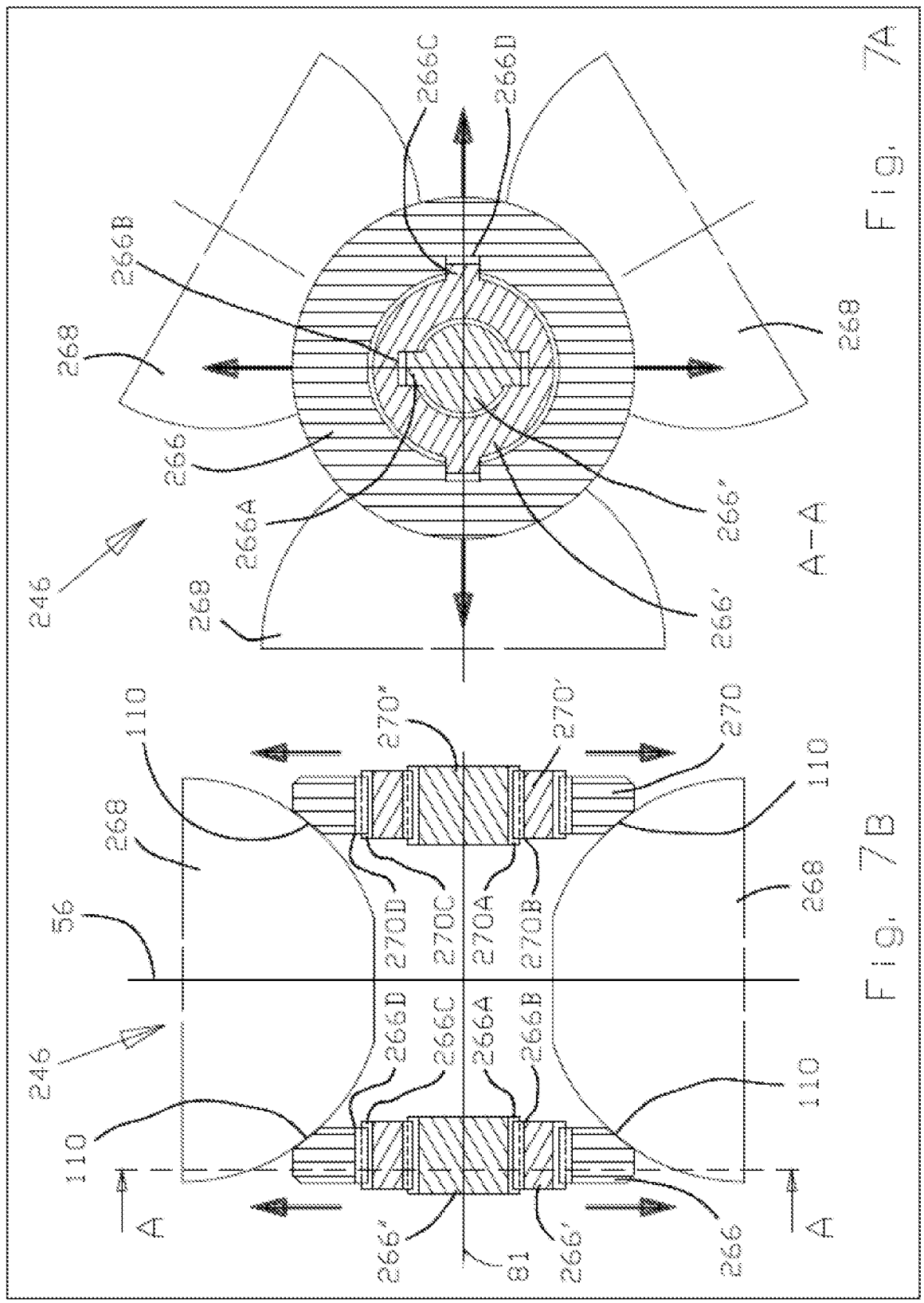

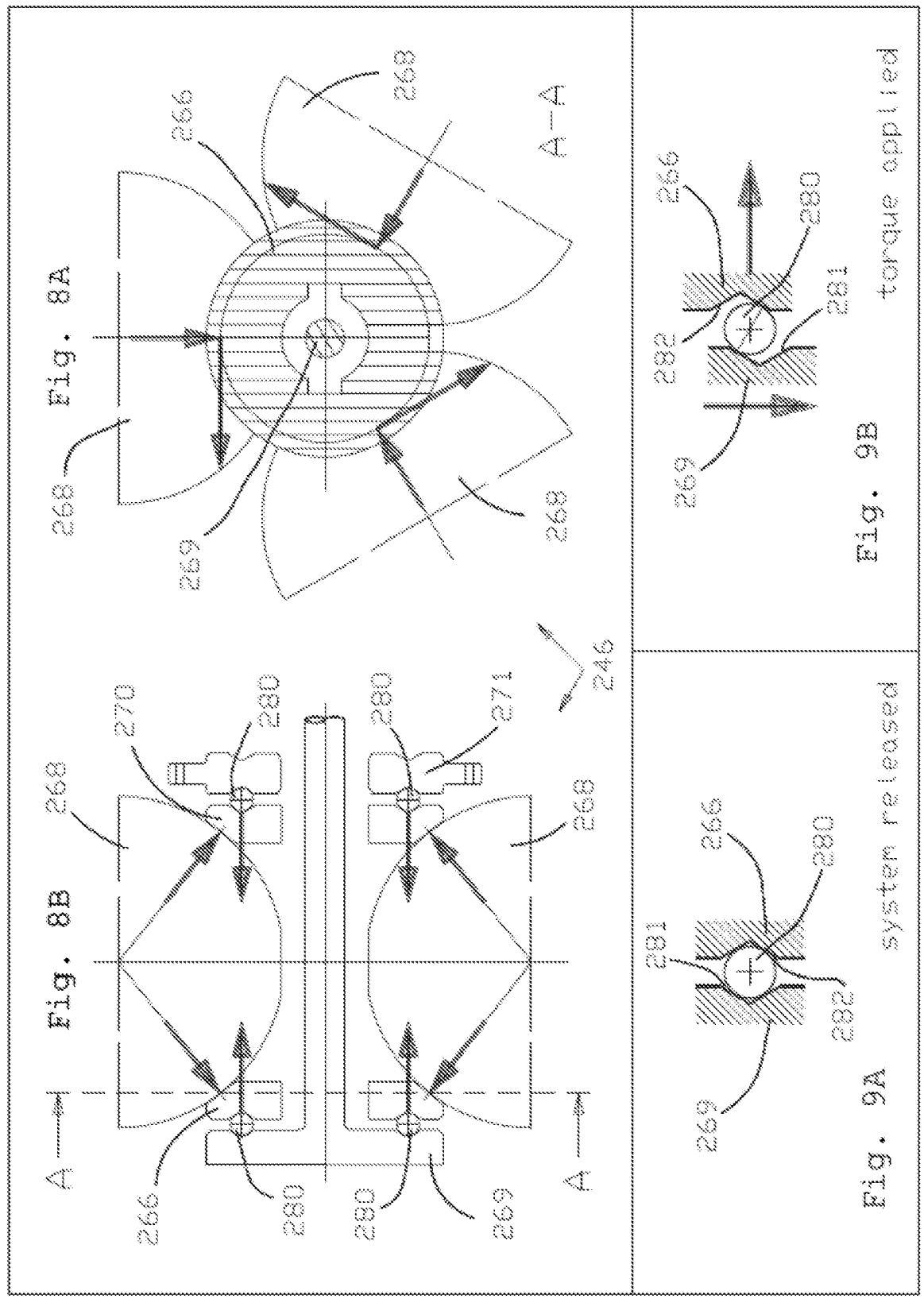

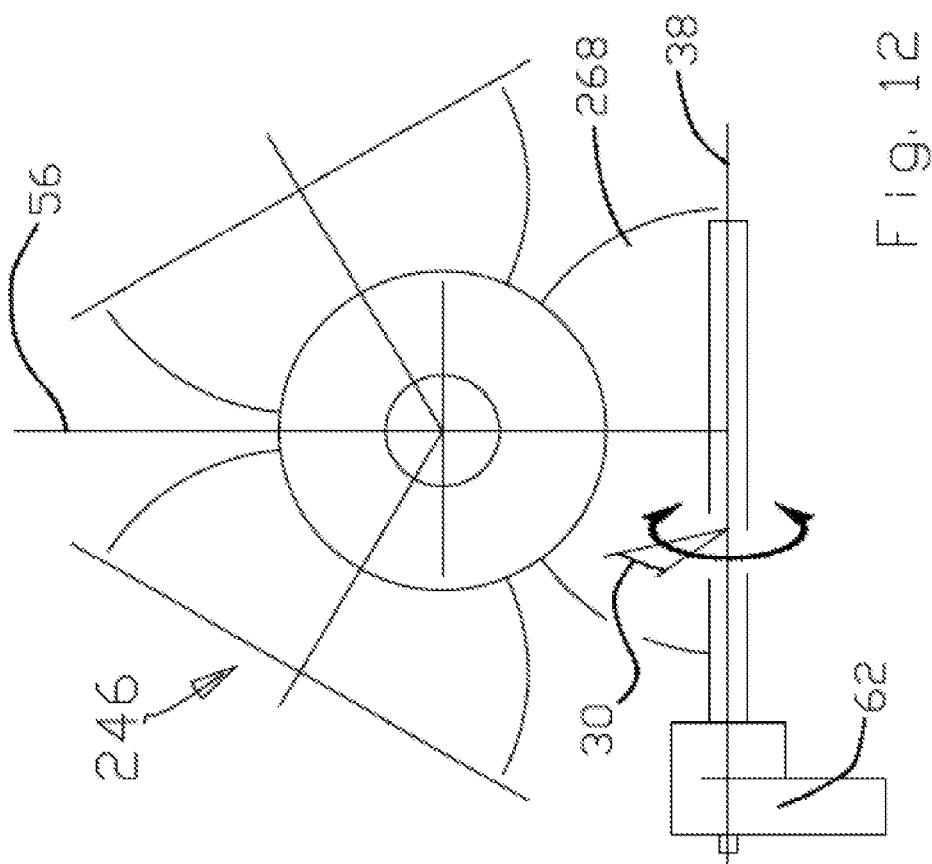

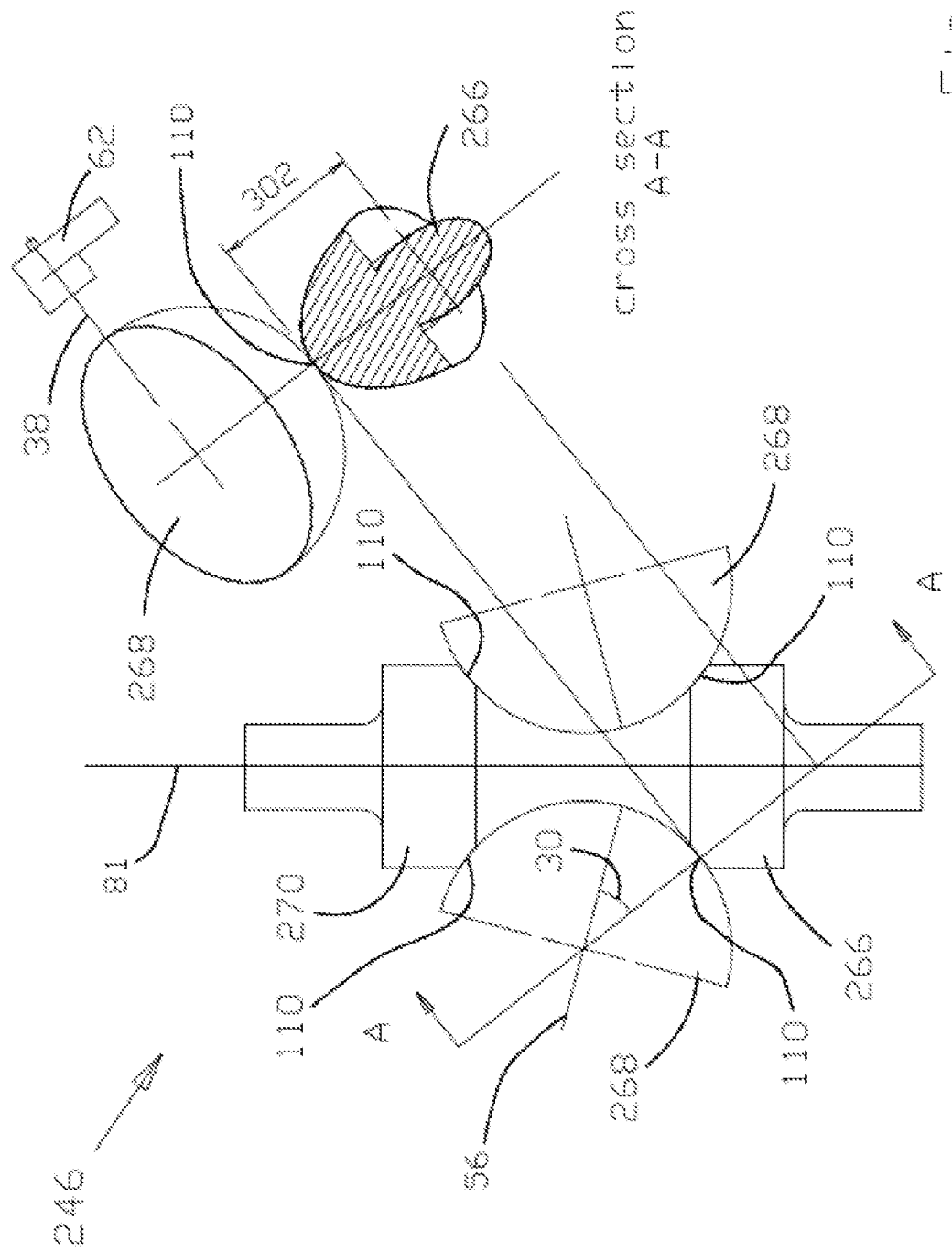

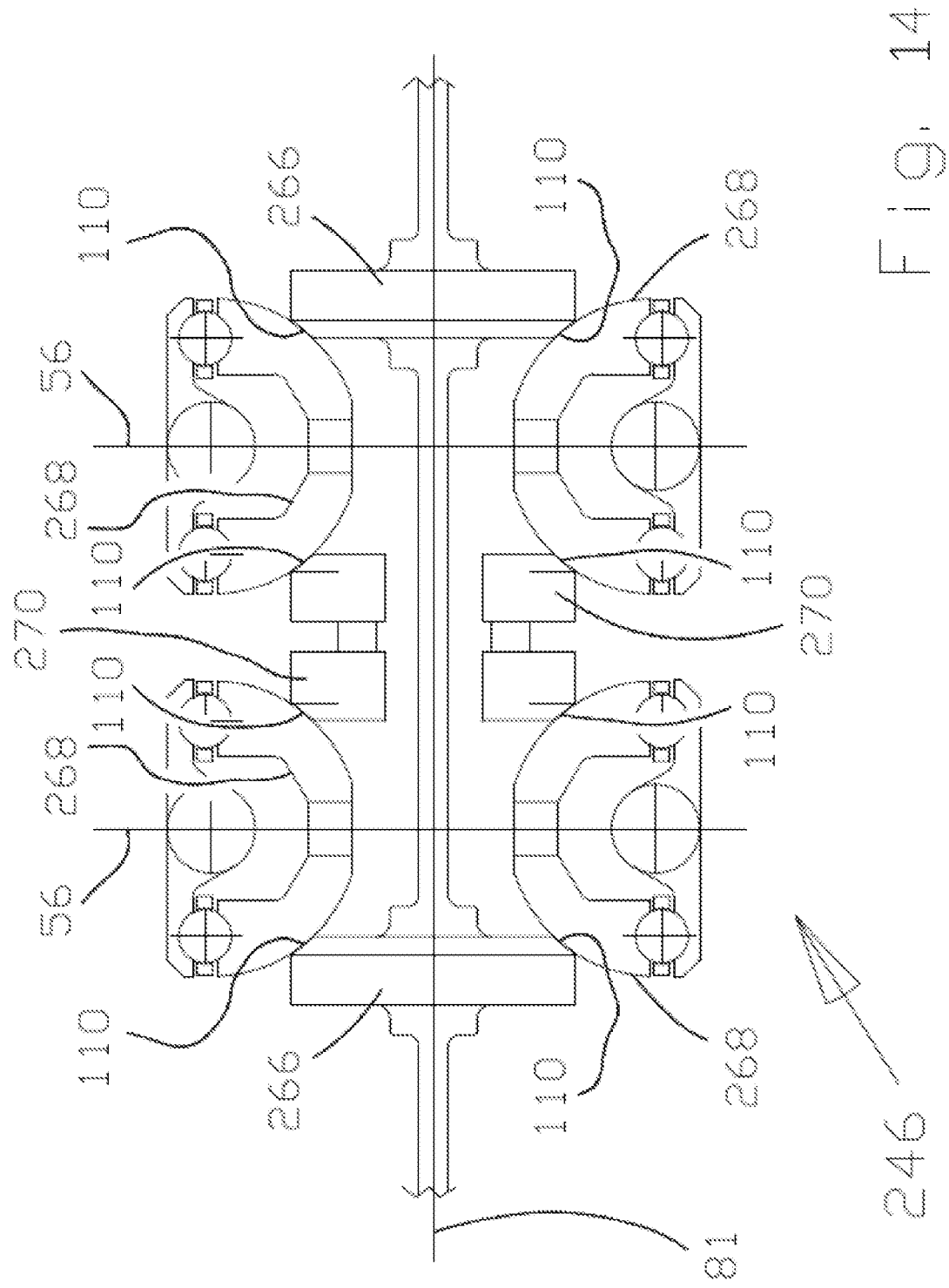

TRACTION SYSTEM FOR HYBRID VEHICLES

INCORPORATION BY REFERENCE

The present application is a continuation-in-part of U.S. patent application Ser. No. 15/031,357, filed Apr. 22, 2016, issued as U.S. Pat. No. 10,308,106 on Jun. 4, 2019, the entire contents of which are incorporated by reference herein as if fully set forth.

INVENTIVE FIELD

The present invention relates to a continuous speed variation device comprising a input friction disc and a output friction disc, and to a traction system for hybrid vehicles comprising the same.

BACKGROUND

In the automotive sector and the sector of industrial machinery, there are known a plurality of hybrid traction systems, comprising an internal combustion engine, an electric motor, a transmission for connecting the motors to the wheels of a vehicle and a control device for controlling the motors and the transmission.

Among the known hybrid systems, some use a continuously variable transmission (CVT) of the toroidal type. Usually, in those systems, the toroidal CVT is of the type with an oscillating roller, whose direction of charge at the contact location oscillates in a manner integral with the roller itself. This represents an enormous disadvantage because the torque which can be transmitted from that toroidal CVT progressively decreases in an asymptotic manner with an increase in the speed of the drive shaft and consequently is adapted poorly to the stresses which are introduced from the vehicle, from the endothermic engine or from the electric motor. In order to compensate for that typical deficiency of the above-mentioned existing toroidal CVT, some constructors have been obliged to implement some auxiliary systems, which are very expensive and not very reliable, for limiting the torque being introduced into the toroidal CVT, and other systems for varying the normal force between the rotary elements of those toroidal CVTs. In particular, the system for varying the charge between the elements of those toroidal CVTs provide for the use of an oil pump, a proportional valve and a complex piece of management software. The use of the hydraulic pump is enormously unfavourable because it brings about a continuous consumption of energy.

Typically, in those existing hybrid traction systems, the electric motor is connected to the wheels by means of a fixed transmission ratio, it therefore being impossible for the control system to control the speed of the electric motor independently of the speed of the vehicle. This is a disadvantage for the overall efficiency of the vehicle because the speed of the electric motor depends on the speed of the vehicle and cannot therefore be maintained at the value corresponding to the maximum output of the electric motor.

Furthermore, in the same known hybrid traction systems, the endothermic engine is connected to the wheels with a series of fixed transmission ratios, it consequently being necessary to use a complex system for controlling the endothermic engine which is capable of controlling both the speed and the torque delivered. Since the torque delivered by the endothermic engine could damage the toroidal CVT immediately downstream, this results in both the control systems, the system of the motor and the system for limiting the moment being introduced into the CVT, having to interact and to communicate with each other. The complexity of those auxiliary control systems is inevitably a source of high costs and unreliability.

In the known hybrid traction systems which do not use a CVT, another disadvantage is brought about in that there is applied to the internal combustion engine a gearbox with discrete transmission ratios which brings about a significant dissipation of energy during the change steps. Furthermore, the internal combustion engine has to continually vary its speed so as to adapt to the travel conditions of the vehicle, thereby operating at the speed corresponding to the minimum specific consumption of fuel only for limited periods. This involves another reduction in the overall efficiency of the vehicle.

Furthermore, in the known hybrid traction systems, there are provided operating conditions, typically at low speed, in which the internal combustion engine is in neutral running, or is disconnected from the transmission. Under those conditions, the wheels of the vehicle receive power exclusively from the electric motor, which therefore has to be suitably over-dimensioned, with a resultant increase in the dimensions and costs.

In order to solve the problem, some hybrid traction systems provide for a device for braking the output of the internal combustion engine so as to prevent operating conditions of neutral running. However, that device has the disadvantage of dissipating kinetic energy every time it is actuated; with a resultant reduction in the overall efficiency of the vehicle.

In other hybrid traction systems in which the combustion engine is always connected to the transmission, under the above-mentioned operating conditions at low speed as far as complete standstill of the vehicle, the member of the transmission connected to the combustion engine does not include the operating condition in which the transmission ratio of the above-mentioned member is such as to determine a zero value of the speed of that member. In those systems, there is applied friction to disconnect the endothermic engine from the remainder of the transmission and a brake for stopping the above-mentioned member in the above-mentioned stopping operations. The use of friction and a brake results in a significant increase in the costs, the spatial requirements of the transmission and the power dissipated without carrying out useful work for the traction of the vehicle.

In those systems, if there is used an additional braking device which is connected to the wheels of the vehicle, when the vehicle is switched off, it is advantageously possible to start the combustion engine by actuating and rotating the electric motor. In fact, since the above-mentioned transmission ratio of the member connected to the combustion engine does not ever assume the value zero under any operating conditions and the speed of the member is never zero, the motion of the electric motor is transmitted directly to the combustion engine in order to start it. Those hybrid traction systems have, however, the disadvantage that, during the deceleration steps of the vehicle, a portion of the kinetic energy of the vehicle is inevitably transmitted from the wheels to the combustion engine by means of the member connected thereto because the member does not ever assume a value of zero for the rotational speed. As known, the combustion engine is not reversible and consequently the energy transmitted thereto during the deceleration steps of the vehicle is completely dispersed by means of dissipation and the overall efficiency of the vehicle is unsatisfactory.

Among the toroidal CVTs which have some of the disadvantages set out above, there is set out in particular, among those in which the rotation direction of the secondary shaft and drive shaft are opposed, the one described in the patent EP1061286 A1 of Torotrak Dev LTD, entitled "Drive mechanism for infinitely variable transmission". In that toroidal CVT, the direction of the charge between the rotating elements oscillates together with the oscillation of the roller. That geometry produces a value of the torque on the secondary shaft which progressively decreases asymptotically with the increase in speed of rotation of the secondary shaft and consequently becomes poorly adapted to the stresses arising from the vehicle, the electric motor and the endothermic engine itself.

Among the toroidal CVTs which have the above-mentioned disadvantage with more than three rollers, there is set out in particular, among those in which the rotation direction of the secondary shaft and the drive shaft are in the same direction, the one described in the patent WO 2008/095116 A2 of Fallbrook Technologies inc., entitled "System and methods for control of transmission and/or prime mover".

Finally, a few other toroidal CVT configurations provide the transmission ratio variation by means of a variation of the clamping force between the rotary elements of those toroidal CVTs. In particular, the system for varying the charge between the elements of those toroidal CVTs provide for the use of an oil pump, proportional valve and a complex piece of management software. The use of hydraulic pump is enormously unfavorable because it brings about a continuous consumption of energy.

Among the toroidal CVTs which have the above-mentioned disadvantage which transmission ratio variation is operated by means of a variation of the clamping force between the rotary elements, there is set out in particular the one described in the patent 20180306284 of Orbital Traction Ltd, entitled "FLUID MOVEMENT SYSTEMS INCLUDING A CONTINUOUSLY VARIABLE TRANSMISSION".

SUMMARY

The technical problem addressed by the present invention is to provide a continuous speed variation device which allows to provide a traction system for hybrid vehicles that does not have a gearbox with discrete transmission ratios, friction or brakes and which is structurally configured so as to overcome all the disadvantages set out with reference to the known prior art, ensuring an increase in the overall efficiency of the vehicle under all conditions of use.

Within this problem a scope of the present invention is to provide a novel CVT ensuring an increase in the overall efficiency of the CVT, as well as cost savings and better reliability. Another scope of the present invention is to provide a method for actuating the transmission ratio variation that is not operating by means of a variation of the clamping force between the rotary elements.

These problems and other problems which will be set out more clearly below are solved by the invention with a continuous speed variation device and the traction system of the type including the same which are constructed in accordance with the appended claims.

BRIEF DESCRIPTION OF THE DRAWINGS

The features and advantages of the invention will be appreciated more clearly from the detailed description of some embodiments which are illustrated by way of non-limiting example with reference to the appended drawings, in which:

FIG. 4 is a schematic front view of the geometry of the toroidal CVT according to the present invention;

FIGS. 5A to 5E are schematic views in accordance with a side view of the geometry of the toroidal CVT of FIG. 3 in various transmission ratios;

FIGS. 6A and 6B are two graphs which illustrate the correlation between the torque transmitted and the transmission ratio and between the power transmitted and the transmission ratio in the toroidal CVT according to the present invention, respectively;

FIGS. 7A and 7B are a schematic front view and a schematic side view, respectively, of the geometry of the toroidal CVT of the present invention according to an alternative embodiment;

FIGS. 8A and 8B are a schematic front view and a schematic side view, respectively, of the geometry of the toroidal CVT of the present invention according to an further embodiment;

FIGS. 9A and 9B are two schematic partial front views of the toroidal CVT of FIG. 8A showing the CVT in a condition released and with torque applied, respectively.

FIG. 12 is a front schematic view of one toroidal CVT including an alternative of actuation device of the transmission ratio variation;

FIG. 13 is a schematic side view of the geometry of the toroidal CVT and relative schematic cross section of the rotary surfaces through the contact locations;

FIG. 14 is a schematic view of an alternative arrangement with two toroidal CVTs, according to the present invention which comprises all the features of FIG. 4.

DETAILED DESCRIPTION OF THE PREFERRED EMBODIMENTS

Figure 1:
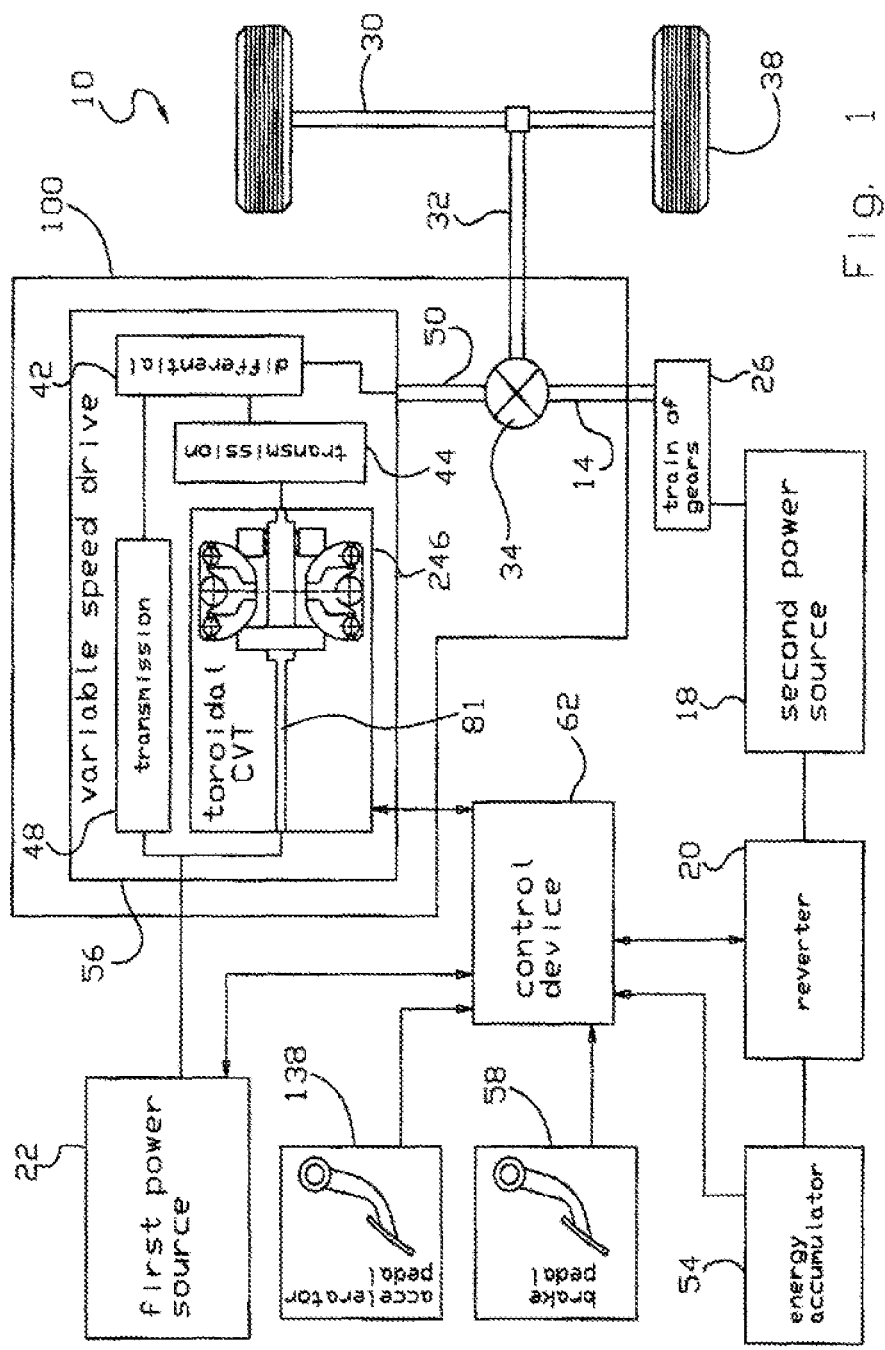
FIG. 1 is a functional diagram of a traction system for hybrid vehicles which includes at least one toroidal CVT according to the present invention.
Figure 2:
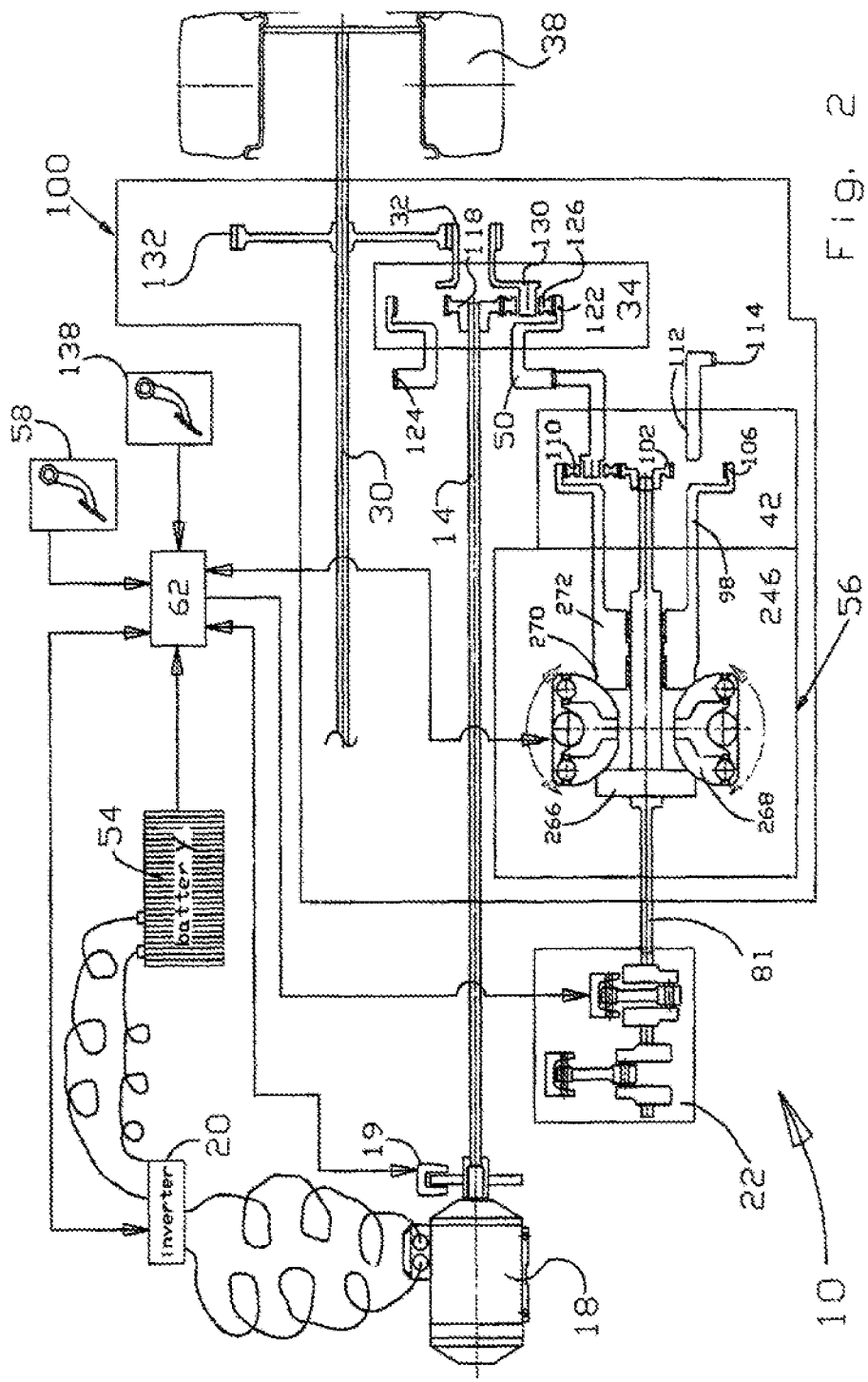
FIG. 2 is a schematic view of a construction variant of a traction system for hybrid vehicles which includes at least one toroidal CVT, in which some functions have been omitted with respect to FIG. 1.
Figure 3:
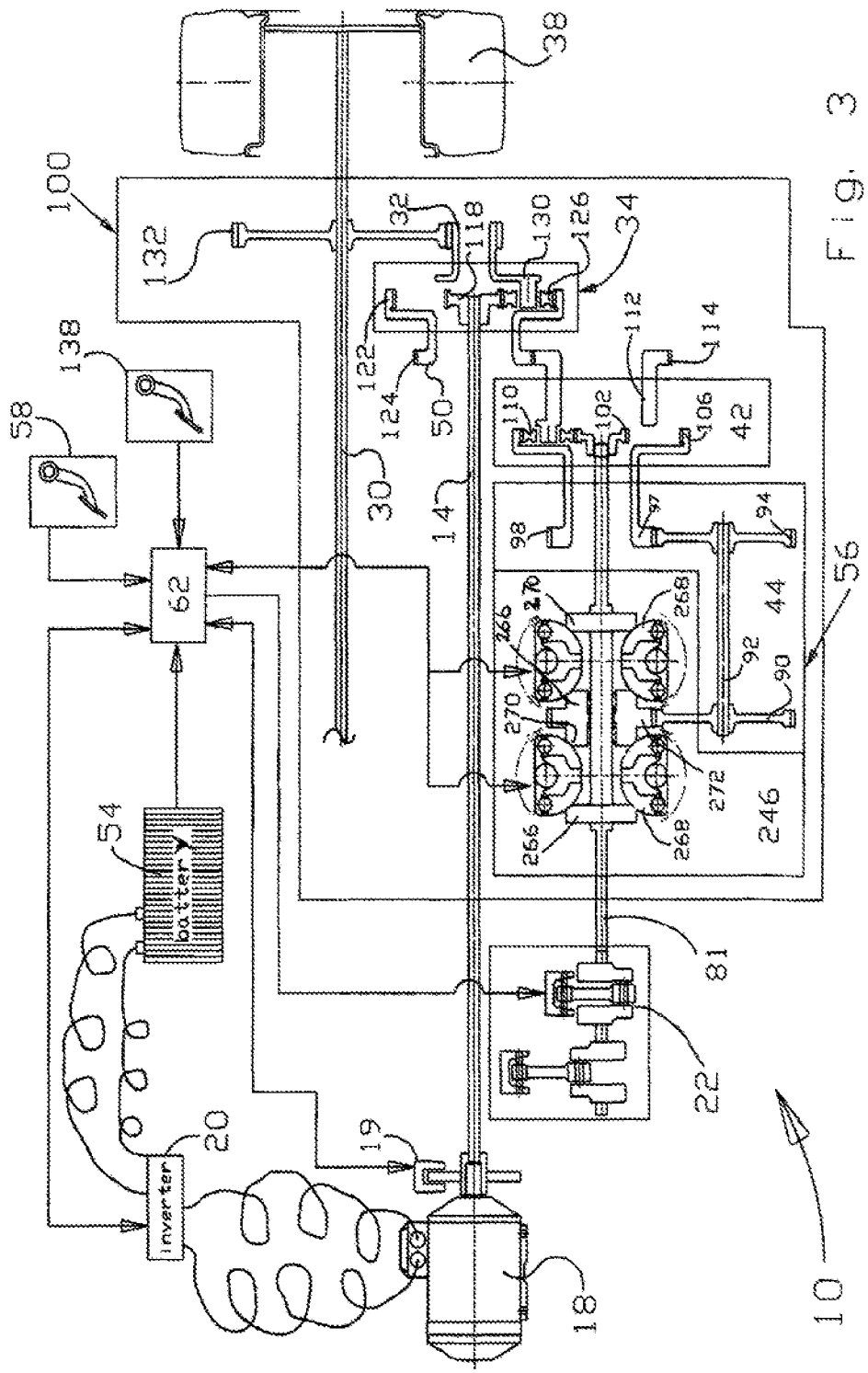
FIG. 3 is a schematic view of a traction system for hybrid vehicles which includes at least one toroidal CVT, according to the present invention which comprises all the functions of FIG. 1.

In FIGS. 1, 2 and 3, there is generally designated 10 a traction system for vehicles. The traction system 10 comprises a first power source 22, a second power source 18 and a transmission 100 which is connected to the first and second power sources 22, 18.

FIG. 4 shows in a schematic view the first power branch 22, the second power branch 42 and a toroidal CVT 246 connected coaxially to the power branches 22 and 42 along the axis 81.

The first power branch 22 delivers or alternatively retrieves power and motion to or from the second power branch 42 through the toroidal CVT 246. The first power branch 22 may be constituted by the electric motor or the combustion engine and the second power branch 42 is constituted by the vehicle.

In some embodiment, the first power source 22 is of the non-reversible type and is, for example, constituted, in the construction variants of FIGS. 2 and 3, by an internal combustion engine which is connected to a transmission shaft 81 for the motion provided in the transmission 100.

In other possible construction variants of the invention, the first power source 22 is constituted by a gas turbine, a steam turbine or another non-reversible power source.

The second power source 18 is of the reversible type and is, for example, constituted, in the construction variants of FIGS. 2 and 3, by an alternating-current electric motor which is connected to the transmission 100 by means of a motion output shaft 14. In other possible construction variants, the second power source 18 is constituted by a direct-current electric motor, or by an air compressor or an assembly of a motor and fluid-dynamic pump or any other reversible power source. There is optionally interposed between the second power source 18 and the shaft 14 a series of gears 26 (illustrated only schematically in FIG. 1).

The second source 18 can be operated both to transmit power to the transmission 100 and to receive power therefrom, via the shaft 14. In that second operating method, the power transmitted from the transmission 100 to the second source 18 is used to recharge an accumulator 54 with energy.

In the variants of FIGS. 2 and 3, the accumulator 54 is constituted by a battery which is electrically connected to the electric motor 18 by means of an inverter 20 which is interposed therebetween. In practice, the electric motor 18 is supplied by the battery 54 via the inverter 20 when it transmits power to the transmission 100 and operates as an electrical generator when it receives power from the transmission 100, recharging the battery 54.

In the other possible construction variants, the accumulator 54 is selected so as to be compatible with the second power source 18. For example, if the second power source 18 is an air compressor or an assembly of a motor and fluid-dynamic pump, a fluid-dynamic accumulator will be used.

The transmission 100 includes a first differential device 34 with a first member 50 which is connected to the first power source 22 via a speed variator 56, a second member 118 which is connected to the second power source 18 and a third member 130 which is connected to an axle 30 of a ground vehicle (not illustrated).

In other possible construction variants, the first member 50 is connected to the second power source 18 while the second member 118 is connected to the first power source 22.

The axle 30 is connected to one or more driving wheels 38.

Each of the members 50, 118 and 130 of the differential 34 can be used both as an input and as an output of the motion for receiving or transmitting power from/to the shaft to which it is connected, respectively.

The transmission 100 comprises a speed variator 56 which is interposed between the first member 50 of the differential 34 and the first power source 22. By means of the speed variator 56, it is possible to vary in a continuous manner the transmission ratio between the shaft 81 and the first member 50 of the differential 34. The speed variator 56 in its most complete configuration comprises at least two transmissions 44 and 48 which are connected in parallel to each other, a transmission with continuous toroidal variation (indicated below as toroidal CVT for the sake of brevity) 246 which is connected in series to the transmission 44 and consequently in parallel with the transmission 48 and a second differential 42.

The second member 118 is directly connected to the shaft 14.

The third member 130 comprises an outer toothing 32 which engages with a toothed wheel 132 which is fixedly joined to the axle 30.

In the construction example of FIGS. 2 and 3, the differential 34 is of the epicyclic type, in which the first member 50 is constituted by a ring gear which is provided with an inner toothing 122, the second member 118 is constituted by a sun pinion and the third member 130 is constituted by a planet-carrying planetary gear, on which there are rotatably supported a plurality of toothed planetary gears 126. The planetary gears 126 engage both with the inner toothing 122 and with the pinion 118.

The differential 34 mentioned is further formed by the first connection member 50 between the epicyclic ring 122 and the combustion engine 22, by the second connection member 118 between the sun pinion and the electric motor 18 and by the third connection member 130 between the planet-carrying planetary gear of the differential itself and the axle 30, as illustrated in FIGS. 2 and 3.

In a possible construction variant of the differential 34 (not present in FIGS. 2 and 3), the first member 50 is connected to the sun pinion, the second member 118 is connected to the epicyclic ring 122 and the third member 130 is connected to the planet-carrying planetary gear of the differential itself.

In both possible construction variants, the third member 130 connects the planet-carrying planetary gear of the differential 34 to the axle 30.

In other possible construction variants of the invention, the differential 34 is of another construction type, for example, with conical gears or epicyclic gears having more than one stage.

For known properties of the epicyclic differentials, the characteristic magnitudes of the differential 34 are connected by the relationships A, B, C, D and E, set out below:

$$Z_{118}N_{118} + Z_{122}N_{50} = (Z_{118} + Z_{122})N_{130}, \quad \text{A)}$$

where:

$Z_{118}$ is the number of teeth of the pinion 118, $Z_{122}$ is the number of teeth of the inner toothing 122, $N_{118}$ is the rotation speed of the sun pinion 118 and the shaft 14, $N_{50}$ is the rotation speed of the ring gear 50, $N_{130}$ is the rotation speed of the planet-carrying planetary gear 130.

$$T_{130} = T_{118}(Z_{118} + Z_{122})Z_{118}, \quad \text{B)}$$

$$T_{50} = T_{130} - T_{118}, \quad \text{C)}$$

$$T_{50} = T_{118}(Z_{122}/Z_{118}), \quad \text{D)}$$

$$P_{50} + P_{118} = P_{130} \quad \text{E)}$$

where:

$T_{130}$ is the torque of the planet-carrying planetary gear 130, $T_{50}$ is the torque of the epicyclic ring gear 50, $T_{118}$ is the torque of the sun pinion 118, $P_{50}$ is the power transmitted by the member 50, $P_{118}$ is the power transmitted by the member 118, $P_{130}$ is the power transmitted by the member 130.

In the relationships A, B, C and D, the direction of the rotation speed and the torque of each member is conventionally considered to be positive in the clockwise direction for an observer positioned along the axes of rotation of the member 50 and the member 118 which is directed towards the differential 34. The rotation speed and the torque of the member 130 are conventionally considered to be positive in the clockwise direction for an observer who is positioned along the axis of rotation 130 and is looking away from the differential 34 towards the member 130. The power is considered to be positive when it is transmitted from the member 50 and from the member 118 to the differential 34 and therefrom to the member 130.

The value of the power transmitted from each member is positive when the rotation speed and the torque have the same direction. For example, when $N_{130}$ and $T_{130}$ are both in the clockwise direction or are both in the counter-clockwise direction, the power transmitted by the differential 34 to the member 130 is positive. When, however, $N_{130}$ is in the opposite direction with respect to $T_{130}$, the power transmitted by the member 130 to the differential 34 is negative, or is transmitted from the shaft 30 to the differential 34. It is known that the first operating method is typically brought about when the power sources 18 and 22 all discharge power to the vehicle for the acceleration thereof, while the second operating method is brought about when the vehicle, during a speed-reduction operation, discharges the kinetic energy thereof, recharging the accumulator 54.

Similar considerations may be applied to the members 50 and 118 or when the rotation speed and the torque have the same sign, the power transmitted by the single member is introduced into the differential 34, and, on the other hand, when the rotation speed and the torque have opposing directions, the power transmitted by each member is discharged from the differential and travels towards the power sources 22 and 18.

As may be seen in FIG. 2, the toroidal CVT 246 is connected to the shaft 81 which with respect to the CVT 246 acts as an input or output shaft for the motion.

The speed variator 56 further comprises a transmission 44 which is connected in series to the toroidal CVT 246. That transmission 44 is preferably of the type with only one discrete transmission ratio.

The speed variator 56 comprises a transmission 48 which is connected in parallel to the member which is constituted by the series connection between the transmission 44 and the device 246. That transmission 48 is of the type with only one discrete transmission ratio.

The toroidal CVT comprises at least a first toroidal friction disc 266 which is mechanically connected to the shaft 81 and that, accordingly, will be also indicated in the following as input toroidal friction disc, and a second toroidal friction disc 270 which is connected to the first toroidal friction disc 266 by means of at least two roller members 268 having a spherical surface of the type with an oscillating position. The second toroidal friction disc 270 is connected to a shaft 272 for transmitting the power being input or output, in accordance with the operating methods of the variator 56. Accordingly, the second toroidal friction disc will be also indicated in the following as output toroidal friction disc. The toroidal friction discs 266 and 270 are arranged coaxially and have an opposing direction of rotation relative to each other.

It should be noted that according to a preferred embodiment, the CVT of the present invention comprises at least three roller members 268.

This is particularly advantageous since it improves the stability of the system.

In fact, the use of three or more rollers in contact with the friction disk allows to create a dynamic constrain in order to avoid the friction disk to move in a perpendicular direction referred to the roller radial load.

In this case the input and output friction discs 266 and 270 will be forced to stay at its rotating center position referred to the three roller members 268 and, with equal contact load value against these three roller members 268.

In the other hand, four or more roller members 268 could keep the friction discs rotating in their center position as well, but would not ensure equal contact load values against the multiple roller members 268.

According to further preferred embodiment, the three rollers are arranged at 120° between them.

Referring back to FIGS. 4 and 5, the device 246 is capable of varying the transmission ratio between the shafts 81 and 272 in a continuous manner with the oscillations of the roller members 268 having a spherical surface. The device 246 is reversible or capable of transmitting power both from the shaft 81 to the shaft 272 and, vice versa, from the shaft 272 to the shaft 81.

In the more complete construction variant of FIG. 3, the speed variator 56 comprises a transmission 44 with a discrete transmission ratio, which is arranged in series with the device 246, including at least a first toothed wheel 90, a shaft 92 and a second toothed wheel 94 which are connected in series to the shaft 272 and which are capable of transmitting the power being input or being output from the shaft 272 in accordance with the operating methods of the variator 56.

As already indicated above, FIG. 1 illustrates in a schematic manner the device which illustrates schematically the system according to the present invention in the most complete variant, in which the transmission 48 which is always of the type having a discrete transmission ratio is arranged parallel with the devices 246 and 44, is connected to the shaft 81 and is capable of transmitting the power being input or being output from the shaft 81 in accordance with the operating methods of the variator 56.

The transmissions 44 and 48 can be reversed or are capable of transmitting power both from the device 246 or shaft 81 to the differential 42 and, vice versa, from the differential 42 to the device 246 or shaft 81.

As already indicated, the variant of FIG. 3 is a particular case of FIG. 1 of the present invention in which the devices 26 and 48 are omitted.

However, the variant of FIG. 2 is a particular case of FIG. 1 of the present invention in which the devices 26, 44 and 48 are omitted.

Similarly to the convention adopted for the differential 34, the transmission of the power from the toroidal CVT 246 to the differential 42 is carried out when the directions of the speed of rotation and the torque of the shaft 272 are synchronous, and vice versa, from the differential 42 to the toroidal CVT 246 when the above-mentioned directions are opposed.

With reference to the relationships B, C and D set out above, the torque on the member 112 of the differential 42 is consequently positive when the vehicle is accelerating or at constant velocity, and is negative when it is slowing down. In the same manner, the torque on the shaft 272 is positive in the first two operating conditions and negative in the third operating condition of the vehicle.

In the construction variants of FIGS. 2 and 3, the direction of rotation of the shaft 272 is always opposed to that of the shaft 81 and the toroidal friction disc 266. As a result, the direction of rotation of the member 98 is always opposed to that of the member 102.

In the examples of all the FIGS. 1, 2, 3, 4 and 5, the toroidal CVT 246 reverses the direction of the movement of the toroidal friction disc 270 with respect to the toroidal friction disc 266.

In the examples of FIGS. 2 and 3, the second differential 42 is of the epicyclic type and is provided with three members 98, 102, 112 which are connected to the transmission 44 (to the shaft 272 in the example of FIG. 2), to the shaft 81 and to the first member 50 of the differential 34, respectively. The transmission 44 comprises two toothed wheels 90, 94 which are fixedly joined to the opposing axial ends of a shaft 92 which engage with a toothed wheel 272 which is fixedly joined to the toroidal friction disc 270 and with a toothing 97 which is provided on the member 98 of the epicyclic differential, respectively.

In the examples of FIGS. 2 and 3, the variator 246 is connected to the epicyclic ring gear of the differential 42 and the planet-carrying planetary gear is the connection element between the second differential 42 and the first differential 34.

In other possible construction variants (not illustrated) of the examples of FIGS. 2 and 3, the member 98 of the differential 42 is connected to the shaft 81, while the member 102 is connected to the transmission 44 (to the shaft 272 in the example of FIG. 2).

In those other possible construction variants (not illustrated) of the examples of FIGS. 2 and 3, the variator 246 is connected to the sun pinion of the differential 42 while the planet-carrying planetary gear is still the connection element between the differential 42 and the differential 34.

In the examples of FIGS. 2 and 3, the member 98 of the second epicyclic differential 42 is constituted by a coaxial ring gear on the shaft 272 comprising at an axial end thereof an outer cylindrical surface, on which there is produced the outer toothing 97 and an inner cylindrical surface and, at the side axially opposed to the outer toothing 97, an inner toothing 106. The member 102 is constituted by a sun pinion which is fixedly joined to the shaft 81 and the member 112 is constituted by a planet-carrying planetary gear, to which there are rotatably connected a plurality of planetary gears 110. The planetary gears 110 engage both with the pinion 102 and with the inner toothing 106.

In other possible construction variants (not illustrated), the epicyclic differential 42 may be of a different construction type such as, for example, with the gears being conical, or of the epicyclic type with a plurality of stages.

For known kinematic properties of the epicyclic differentials, the characteristic magnitudes of the differential 42 are connected with the relationship F, set out below:

$$Z_{102}N_{102}+Z_{106}N_{98}=(Z_{102}+Z_{106})N_{112}, \qquad F)$$

where:
$Z_{102}$ is the number of teeth of the sun pinion 102,
$Z_{106}$ is the number of teeth of the inner toothing 106,
$N_{102}$ is the rotation speed of the sun pinion 102,
$N_{98}$ is the rotation speed of the ring gear 98,
$N_{112}$ is the rotation speed of the planet-carrying planetary gear 112.

The first member 50 of the differential 34 comprises an outer toothing 124 which engages with an outer toothing 114 which is provided on the planet-carrying planetary gear 112 of the differential 42. By means of the gearing comprising the toothings 114, 124, the first member 50 receives or transmits the motion from/to the variator 56 by means of the differential 42, respectively.

The FIGS. 4 and 5A-E illustrate the toroidal CVT 246 in greater detail.

The toroidal CVT 246 is capable of varying the transmission ratio between the shafts 81 and 272 in a continuous manner by means of the oscillations of the roller members 268 with a spherical surface.

In other words, the device 246 is capable of varying the transmission ratio between the input friction disc 266 and the output friction disc 270 in a continuous manner with the oscillations of the roller members 268 having a spherical surface. At least one actuator 62 is providing oscillating angle 30 of the roller members 268 around the oscillating axis 38, which is perpendicular to the axis of rotation 81 and simultaneously perpendicular to the axis of rotation 56 of the roller member 268.

Note that the actuator 62 is not applying any clamping effort on the friction discs 266 and 270 along the axis 81. This is a significant advantage of the present invention versus the known prior art because just a negligible effort and power is required to actuate the transmission ratio variation of the device 246. Hence, the overall efficiency of this invented speed variation device 246 is going to be much higher than the known prior art.

The device 246 is reversible or capable of transmitting power both from the disc 266 to the disc 270 and, vice versa, from the disc 270 to the disc 266.

In some embodiment, the direction of rotation of the input friction disc 266 is always opposed to that of the output friction disc 270 because the contact locations 110 between the input friction disc 266 and the roller member 268 and the contact locations 110 between the output friction disc 270 and the roller member 268 are at opposite positions referred to the rotation axis 56 of the roller member 268. Hence, the toroidal CVT 246 reverses the direction of the movement of the output friction disc 270 with respect to the input friction disc 266.

The advantage of this particular arrangement respect to some of the known prior art is that the present invention is suitable to be applied together with a differential set, which first input branch is connected to the input friction disc 266, the second input branch is connected to the output friction disc 270 and the third branch (often known as planetary carrier) is the output branch of the motion, in order to achieve, for a specific transmission ratio of the toroidal CVT 246, the speed zero at such output third branch regardless the rotation speed of the input friction disc 266. Such particular arrangement, known as IVT (infinite variable transmission), is able to achieve the infinite overall spread of transmission ratio, with no need of any further reverse gear in the transmission pipe line.

FIGS. 5A, 5B, 5C, 5D and 5E illustrate the side view of the toroidal CVT 246 in greater detail. The FIG. 12 illustrates a front view of the toroidal CVT 246. The FIG. 13 illustrates a cross section of the toroidal CVT 246 through the convex radius 302 of the input friction disc 266.

In the FIGS. 5A to 5E, there are designated 301 and 303 two main radii of curvature of the spherical surface of the roller members 268 at the contact location with the toroidal friction disc 266 and 270, respectively. Since the friction surface of the roller members 268 is of the spherical type, the two main radii 301 and 303 are of equal dimensions. In the same Figures, there are designated 302 and 304 the two main radii of curvature of the contact surface of the toroidal friction disc 266 (also corresponding to those of the disc 270) at the contact location with the roller members 268. The radius 302 is of the convex type while the radius 304 may be concave (as indicated in the Figures) or convex, or may assume an infinite value when the surface of the toroidal friction disc(s) 266 and/or 270 is of the conical type.

In the example of FIGS. 4 and 5, the toroidal friction discs 266 and 270 have symmetrical friction surfaces, for which the radii 302 and 304 have equal dimensions and concavity for both the toroidal friction discs 266 and 270. In other possible variants of the toroidal CVT 246 (not illustrated in the Figures), the radii 302 and 304 may be of different values if the toroidal friction discs 266 and 270 have a friction surface with different geometry, provided however that the radius 302 remains at the convex type in any possible variants.

The significant advantages of this particular geometry with radius 302 convex in any possible variant of the toroidal CVT 246, respect to some of the known prior art, are the easy, robust and economical machining of the convex surface versus a concave type and, the stability of the shape of the contact pattern at the contact locations 110 and consequently an extremely stable operating mode of the toroidal CVT 246 with no vibration, no risk of resonance and no mechanical failure.

In FIG. 4, there is designated 306 the angle s1 between the line which is tangent to the friction surface at the contact location and the rotation axis of the toroidal friction disc 266. There is designated 308 the angle s2 between the line tangent to the friction surface at the contact location and the rotation axis of the roller member 268.

For an observer who is positioned along the rotation axis of the toroidal friction disc 266 and who is looking at the toroidal CVT 246, the rotation of the above-mentioned disc 266 is conventionally considered to be positive if the disc 266 rotates in the clockwise direction. For a second observer who is positioned at the vertex of the angle 308, because there is no slippage between the contact surfaces of the disc 266 and the roller member 268, a positive direction corresponds to a positive rotation direction of the disc 266, that is to say, a clockwise rotation direction of the roller member 268. For the same first observer along the rotation axis of the toroidal friction disc 266 who is looking at the toroidal CVT 246, because there is no slippage between the contact surfaces of the roller member 268 and the disc 270, a negative direction corresponds to a positive rotation direction of the roller member 268, that is to say, a counter-clockwise rotation direction of the disc 270. Since the discs 266 and 270 are arranged coaxially, there is a functional characteristic of the present toroidal CVT 246 that the above-mentioned discs have rotation directions opposed to each other.

In FIGS. 5A-E, the force applied to the contact location between the disc 266 and the roller member 268 is designated 310. In the toroidal CVT 246 of the present invention, the force 310 is assumed to be a constant entity independently of the variation in the transmission ratio of the device 246.

It should further be observed that in the toroidal CVT 246 of the system according to the present invention, the angle 306 between the line tangent to the friction surface at the contact location and the rotation axis of the toroidal friction disc 266 remains constant for each transmission ratio of the CVT, while the angle 308 between the above-mentioned line and the rotation axis of the roller member 268 varies in accordance with the variation of the transmission ratio of the CVT.

In FIGS. 5A-5E, there is designated 312 the contact diameter between the roller member 268 and the toroidal disc 266 or 270 which is positioned on the disc itself, which does not vary in accordance with the variation of the transmission ratio of the toroidal CVT.

Since the main radii 301, 302, 303 and 304 as for the contact force at the contact location of the friction surfaces 310 remain unchanged in accordance with the variation of the transmission ratio of the toroidal CVT 246, as described above, it is evident that the Hertzian stress (specific pressure at the contact location) at the contact location will remain constant at any value of the transmission ratio which the toroidal CVT 246 assumes. As a result, advantageously, at a constant value of contact force 310, it will correspond to a constant Hertzian stress which is of suitable dimensions above the fatigue limit of the material of the roller member 268 and the toroidal friction discs 266 and 270; dispensing, as explained above, with the use of complex and expensive auxiliary devices for the variation of the force 310.

In the known toroidal CVTs and also in the present invention 246, there is an admissible friction coefficient between the contact surfaces which remains fundamentally unchanged. The above-mentioned friction coefficient establishes the maximum tangential load and torque which can be transmitted by the toroidal friction discs 266 and 270. As a result of the above, that maximum torque value which can be transmitted by the toroidal friction discs 266 and 270 remains constant independently of the transmission ratio of the toroidal CVT 246.

In the example of the FIGS. 5A-5E, the transmission ratios indicated between R=0.38693 and R=1.0 indicate a reduction in the rotation speed of the toroidal friction disc 270 with respect to the disc 266. As a result of the law of conservation of power, the torque transmitted by the disc 270, with respect to the torque transmitted by the disc 266, is inversely proportional to the transmission ratio set out above, for which it is higher as an absolute value. As a result, the maximum moment which can be transmitted by the toroidal CVT 246, measured on the disc 270, corresponds to the maximum torque which can be transmitted by the same toroidal disc 270. In the example of the graph of FIG. 6A, where the torque is indicated in Nm on the disc 270 as a function of the transmission ratio of the toroidal CVT 246 of the present invention, for the transmission ratio values being reduced (from R=0.38 to R=1.0), the value of the torque is constant and equal to the maximum permitted at the disc 270 itself.

Similar considerations may be applied for the transmission ratios between R=1.0 and R=2.5844, which therefore indicate a multiple of the rotation speed of the toroidal friction disc 270 with respect to the disc 266. As a result of the law of conservation of power, the torque transmitted by the disc 270, with respect to the torque transmitted by the disc 266, is inversely proportional to the transmission ratio set out above, for which it is lower as an absolute value. As a result, the maximum moment which can be transmitted by the toroidal CVT 246, measured on the disc 270, corresponds to the maximum torque which can be transmitted by the toroidal disc 266 divided by the transmission ratio R above. In the example of the graph of FIG. 6A, for the transmission ratio values being reduced (from R=1.0 to R=2.59), the value of the torque at the disc 270 decreases in inverse proportion to the transmission ratio R.

In other possible variants of the toroidal CVT 246 (not illustrated), the transmission ratios R may assume different numerical values.

As illustrated in FIG. 6A, the torque which can be transmitted by the toroidal CVT of the present invention has a first portion of constant value, referred to as a reduction ratio, and a second portion of constant power, that is to say, with a decreasing torque, referred to as a gear-up ratio.

A significant advantage of the present invention is constituted by the fact that the shape of the graph of permitted torque of the toroidal CVT 246 indicated in FIG. 6 is advantageously of the same type as the typical forces which are introduced from the torque which is delivered by the AC electric motor 18 and from the same typical method of use of a hybrid vehicle, that is to say, with a first portion with constant torque and a second portion with constant power. As a result, the toroidal CVT 246 of the present invention has a line of permitted torque with a constant safety coefficient with respect to the forces which are introduced.

A further advantage connected to the use of a CTV according to the present invention is that the use of friction disks with toroidal shaped friction surface, which is a convex surface, improves the stability of the system.

To this regard, it should be noted that the friction disk on the cross section of the contact point between disk and roller can be of two different types: concave or convex.

As per the contact stress according to Hertz theory, the concave surface is favorable to get wider contact pattern. However, the wider is the contact pattern the bigger is the distance the center point of the contact can move in one direction and the opposite direction. Consequently, if the friction disk rolling surface is a concave shape, the position of the center point of the contact is more instable.

Contrarily to the present invention, known types of toroid CVTs have friction disk with concave surface. Due to that particular geometry, operating instability occurs till the engagement of large vibration and complete rupture of the toroid CVT itself.

Instead, the toroid CVT according to the present invention has only convex surface of the friction disk on the cross section on the contact point. The disk surface will keep convex in any operation condition and transmission ratio of the present toroid CVT, thus achieving the above mentioned advantage.

Instead, referring to the FIG. 13, the toroid CVT 246 according to the present invention has only convex surface of the friction disc on the cross section on the contact location 110. The disc surface will keep convex in any operation condition and transmission ratio of the present toroid CVT, thus achieving the above mentioned advantage.

With reference to FIGS. 7A and 7B, according to some embodiments, the roller members 268 that are floating and self-aligning between them.

The toroid CVTs according to the prior art have the rolling elements in a fix position. Either the roller member and the friction disk are supported in a such way not to be able to meet the best relative position between them. Most of the them are supported by some very accurate and expensive bearings.

In those existing toroid CVTs, some extremely accurate and expensive machining are required in order to limit as much as possible the rolling elements tolerances of their geometrical position.

Furthermore, any geometrical offset of those elements will procure a different contact load between the rolling elements and a different speed of the contact point (due to a different rolling radius). Wear and high contact stress will occur.

On the contrary in the toroid CVT according to the embodiment of FIGS. 7A and 7B, at least one of the roller member is radial floating and self-aligning referred to the other.

In other words, in the toroid CVT 246 according to the embodiment of FIGS. 7A and 7B, the input and output friction discs 266 and 270 and the roller members 268 achieve the best relative position between them. Consequently, no heavy duty and expensive support bearings and no extremely expensive accurate machining are required. Furthermore, no excessive contact load and no excessive wear of the above-mentioned components occurs.

This is achieved by using a pair of intermediate disks 266' and 266" and, optionally, a further pair of intermediate disks 270' and 270". Each of the intermediate disk 266' and 266" (and analogously the disks 270' and 270" for which similar concepts applies) are capable of movement along a radial direction. Preferably, disk 266' is capable of movement along a direction which is perpendicular to the one of other intermediate disk 266". In this manner the friction disk 266, which is supported by the intermediate disks 266' and 266" is capable of movement along a plane perpendicular to its axis.

According to a preferred embodiment, the movement capability can be achieved by providing a connection with play between the intermediate disks and between the outermost intermediate disk 266' and the friction disk 266 and also providing a projection 266A housed in a respective seat 266B in order to transmit torque between successive disks. In any case, it is evident that further solution can be used in order to achieve this result.

The friction discs 266 and 270, which are accordingly provided with capability of floating and movement along a radial direction, will meet immediately the optimum position referred to the roller members 268.

As a consequence of this embodiment, the toroid CVT according to the present invention does not require any expensive support.

With reference now to FIGS. 8A and 8B, according to a further embodiment, which can be used also in connection to the present embodiment, a mechanical axial cam is applied on at least one of the friction disks.

To this purpose, the friction disk 266 is coupled to a complementary disk 269 which is actually in contact with the roller members 268. Similarly, according to a preferred embodiment, also the friction disk 270 is coupled to a respective complementary disk 271.

The torque between the friction disk and the complementary disk is achieved by means of a spherical or cylindrical member 280, which is housed between two seats 281, 282 formed on opposing surfaces of the friction disk and of the complementary disk, respectively. According to the present invention, the spherical or cylindrical member together with the seats form the axial cam.

When torque is transmitted the shape of the seat is such that the complementary disk is displaced in a direction such that a pre-load is provided on the roller members.

FIGS. 9A and 9B represents an example (but not exclusive) of mechanical axial cam applied on the friction disk of the toroid CVT of the present invention.

It should be noted that such a mechanical axial cam apply an axial preload to the CVT system as a linear function of the transmitted torque as shown in FIG. 9B.

It should be also noted however that such a mechanical axial cam is suitable to be used just on those toroid CVTs where the transmitted torque on the lateral disk is not varying with the CVT gear ratio itself as in the CVT according to the present invention.

It is also appropriate that the lateral disk keeps the transmitted torque constant all the CVT gear ratio long, in order to get the optimum performance of such a governing device.

The most significant advantage of this preferred embodiment of the toroidal CVT 246 in comparison with some known prior art, is the fact that the clamping effort is instantaneously applied to the system and does not require any external power consuming device, such as a hydraulic or electric actuator. This particular feature improves further the overall efficiency of the toroidal CVT 246.

It should be also noted however that such a mechanical axial cam is suitable to be used just on those toroid CVTs where the transmitted torque on the friction discs 266 and 270 is not varying with the CVT gear ratio itself, as in the CVT according to the present invention. Hence, it is also appropriate that the friction discs 266 and 270 keep the transmitted torque constant all the toroidal CVT 246 gear ratio long, in order to get the optimum performance of such a pre-load actuating device.

In a preferred embodiment of the toroid CVT of the present invention, both the friction disks (input and output) are actuated by a mechanical axial cam.

Figure 10:
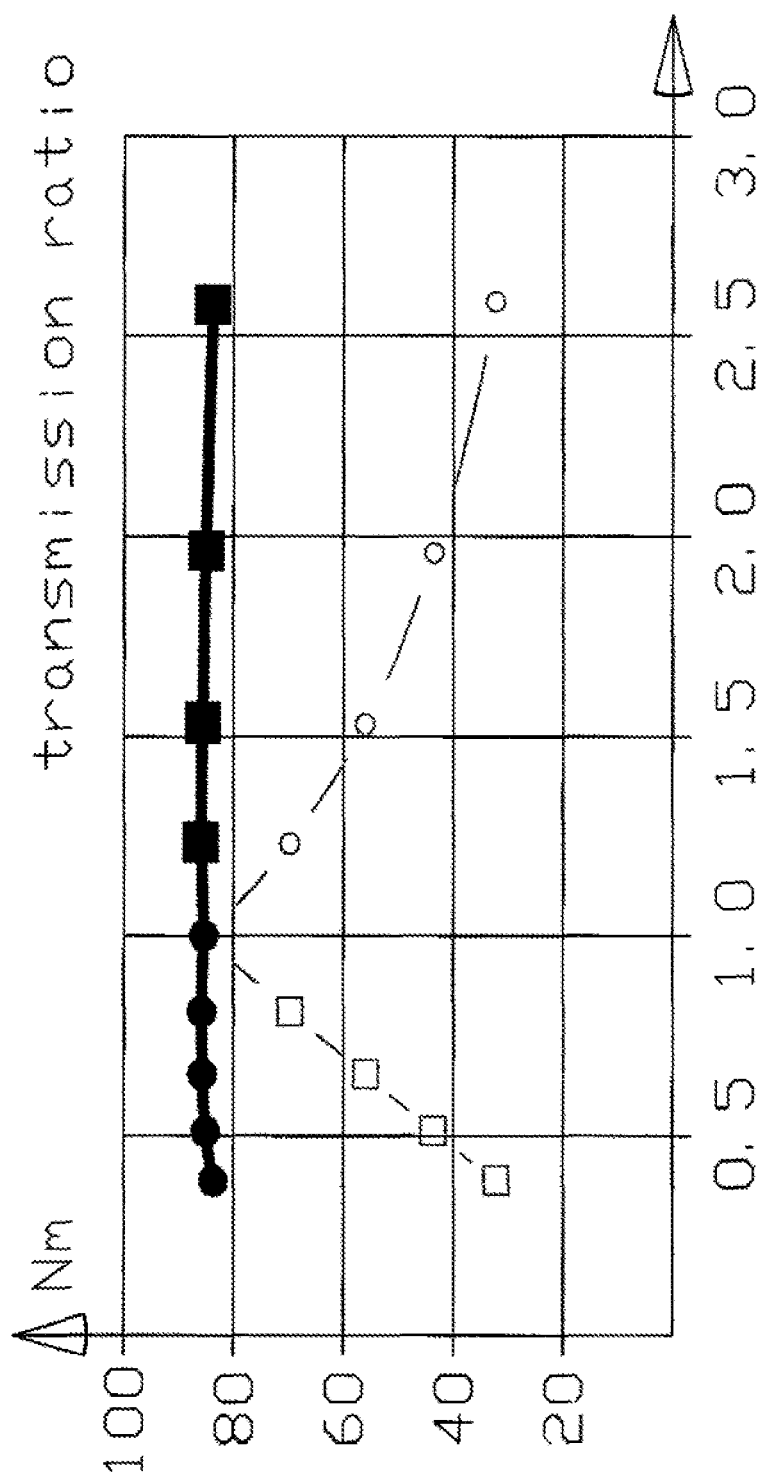
FIG. 10 is a graph which illustrates the correlation between the torque applied on a first and second toroidal friction disc and the transmission ratio according to the present invention.
Figure 11:
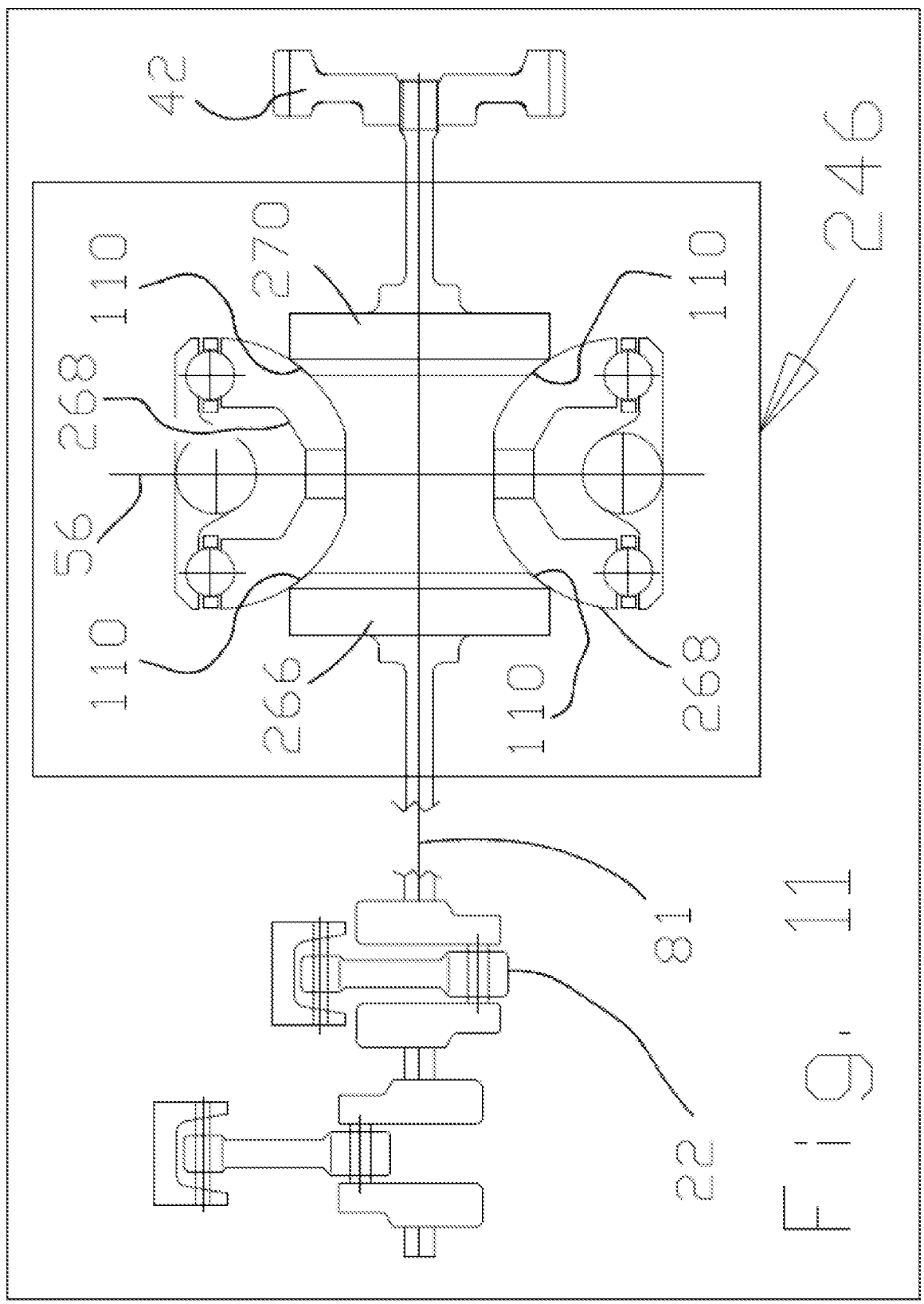
FIG. 11 is a functional diagram of one toroidal CVT according to the present invention.

Therefore, it is a significant advantage of the toroid CVT, the fact that its geometry is so that the transmitted torque has a flat and constant torque all the CVT gear ratio long, as shown in FIG. 10.

The advantages of the present embodiment can be understand by considering that every toroid CVT is transmitting torque through the contact pressure between the rolling surfaces. However, high contact pressure causes high power losses (rolling losses) and low contact pressure is not able to avoid slipping on the contact point if unexpected peak torque occur.

In the other hand, in some applications, i.e. on the agricultural tractors, sometimes the vehicle can deliver power only for the P.T.O. and no power for traction. In that case, it would be desirable not to preload and not to apply any pressure on the rolling surfaces of the traction CVT.

Consequently, a special device that is able to govern the pressure between the rolling surfaces as a linear function of the required transmitted torque, could be suitable to adjust the proper preload of the complete CVT system.

Many hypothesis of such a device have been done in the prior art. Certainly, an electronic, a pneumatic or a hydraulic device cannot fulfil all the requirements of the above applications. It is known that all of these devices have some delay to govern the proper preload of the CVT system. In case of torsional vibration (and torque peak) of the engine crank shaft, the actuation of the electronic, pneumatic or hydraulic device would occur too late. Furthermore, they are too expensive.

The axial cam according to the present embodiment instead guarantee prompt and instantaneously actuation since it pressures the system as an immediate function of the required transmitted torque.

Therefore, the main advantages of such a mechanical axial cam device applicability in our toroid CVT are: instantaneous actuation, automatic actuation, cheap and easy manufacturing, no power losses due to excessive preload when no torque for traction is required, no risk of slipping on the contact point and no wear of the rolling surfaces.

The FIG. 14 represents a schematic view of an alternative arrangement with two toroidal CVTs 246, according to the present invention which comprises all the features of FIG. 4. It should be noted that the two input friction discs 266 are connected between them and are rotating in the same direction. In the same manner the two output friction discs 270 are connected between them and rotating in an opposite direction referred to the input friction discs. In this this particular arrangement of the toroidal CVTs, the preferred embodiment has three roller members 268 in the first set of toroidal CVT and additional three roller members 268 in the second set of toroidal CVT.

The main advantage of this particular embodiment in comparison with some of the known prior art is the capacity to transmit power and torque twice higher with the same overall efficiency of a single toroidal CVT 246.

With reference again to FIG. 1, the traction system 10 comprises a control device 62 for the transmission 100 and the power sources 18, 22.

The control device 62 acts on the operating parameters of the second power source 18 by means of the inverter 20 and the first power source 22, establishing only the rotation speed thereof. The control device 62 acts on the parameters of the second reversible power source 18, establishing the rotation speed, the torque and also the direction of the rotation speed thereof.

For the known properties of the differentials 34 and 42 used in the transmission 100, once the value of the torque of the second reversible power source 18 is established by the control device 62, the value of the torque acting on the toroidal CVT 246 and on the endothermic engine 22 is automatically defined. Similarly, the same shape of the graph characteristic of the AC electric motor 18, that is to say, a first portion with a constant torque and a second portion with constant power, is proportionally reproduced as a graph of force on the toroidal CVT 246 and on the endothermic engine 22. What is described results in another two advantages of the present transmission 100 for hybrid vehicles: it is not necessary to control the torque delivered by the endothermic engine 22 and the use of any troublesome and unreliable device for limiting the torque being introduced into the toroidal CVT 246 is completely dispensed with.

The control device 62 is further active on the variator 56 for setting the transmission ratio between the first power source 22 and the first member 50 of the first epicyclic differential 34.

In the example of FIGS. 2 and 3, the control device 62 acts on the pair of roller members 268 in order to vary the position and the contact location thereof with the toroidal friction discs 266 and 270. The speed of the shaft 272 connected thereto varies as a result.

It is therefore possible, by means of the control device 62, to act on the variator 56 so as to set a value of the speed of the shaft 272 independently of the value of the speed of the shaft 81 connected to the first power source 22.

The control device 62 receives as input signals:

the position of an accelerator pedal 138 which can be operated by the user;

the position of a brake pedal 58 which can be operated by the user;

the position or the transmission ratio of the speed variator 246;

the energy charge of the accumulator 54;

the operating parameters of the inverter 20;

the rotation speed of the non-reversible power source 22.

The accelerator pedal 138, by means of which the driver communicates the intention to accelerate, slow down or maintain the vehicle in a state of constant speed, is connected to the control device 62 by means of a connection which is electrical, mechanical, hydraulic or of some other type.

The brake pedal 58, via which the driver communicates the intention to brake or to maintain the vehicle in a state of constant speed, is connected to the control device 62 by means of a connection which is electrical, mechanical, hydraulic or of some other type.

In other possible construction variants, the control 62 also receives as a complementary input signal the rotation speed of the shafts and members.

According to a control method for the traction system 10, it is possible to actuate the variator 56 by means of the control device 62 so as to set a value of the speed of the sun gear 102 equal to:

$$N_{102} = -(Z_{106}/Z_{102})N_{98} \qquad \text{G)}$$

That value which depends only on the speed of the ring gear N98 establishes a value of the speed N112 of the planet-carrying planetary gear 112 of zero, as is evident from the substitution of the relationship G in the relationship F.

When the planet-carrying planetary gear 112 is stationary, the first member 50 of the differential 34 which engages directly with it also has a speed of zero and consequently does not transmit power.

The relationship H set out below is evident from the substitution of the value of zero of the power transmitted by the member 50 in the relationship E:

$$P_{118} = P_{130} \qquad \text{H)}$$

In this situation in the differential 34, the power is transmitted by the second member 118 to the third member 130, or vice versa. In particular, in the case in which the vehicle is decelerating, the braking power transmitted by the wheels 38 to the axle 30 is transmitted completely, net of mechanical losses, to the shaft 14 and from it to the second reversible source 18 and to the accumulator 54. In the deceleration step of the vehicle, therefore, it is possible to use all the braking power to recharge the accumulator 54.

So that the planet-carrying planetary gear 112 can remain stationary independently of the rotation speed of the non-reversible source 22, it is necessary for the sun pinion 102 positioned on the same member 102 to be able to assume a rotation direction opposed to that of the epicyclic ring gear 106 positioned on the member 98, as clearly set out by the relationship G.

Advantageously, the system according to the present invention allows the production of that characteristic because the characteristics of the toroidal CVT 246 described above make it capable of reversing the rotation direction of the disc 270 with respect to the disc 266. The opposing rotation direction of the input members 102 and 98 of the differential 42, which establishes a speed of zero of the planet-carrying planetary gear 112, is brought about for a predetermined discrete value of a transmission ratio of the continuous variator 246. The members 102 and 98 therefore also take up opposing rotation directions for values of a transmission ratio of the continuous variator 246 which are different from that for which the planet-carrying planetary gear 112 remains stationary. In that last operating condition, it is evident from the analyses of the relationships from A to F applied to the differential 42, because the torques in the members 102 and 98 are synchronous, that the values of the powers of those members also have opposing directions. It follows from the relationship E applied to the differential 42 that at least one of the two input members 102 and 98 transmits a power value greater than that transmitted by the output member 112. The output power from the member 112 therefore remains of the same entity as the power delivered by the non-reversible source 22, for which at least one of the two members 102 and 98 consequently transmits a power value greater than that delivered by the source 22. In the case of the FIGS. 2 and 3, independently of the various construction variants thereof, the continuous variator 246 positioned in connection with the member 98 transmits a power value greater than that delivered by the source 22.

Consequently, so that the output member 112 of the differential 42 can remain stationary in a predetermined operating condition corresponding to a transmission ratio of the continuous variator 246, it is a necessary condition that the geometry of the variator 56 allows the opposite rotation direction of the members 102 and 98 and that the continuous variator 246 transmits a power value greater than that delivered by the source 22.

In the state in which the first member 50 is stationary, the first power source 22, connected thereto via the variator 56, may be switched off without the vehicle being subjected to any variations of the motion conditions thereof.

According to another control method of the traction system 10, the speed of the axle 14 and the first member 50 are set so that the electric motor 18 operates near the maximum output speed of the electric motor 18, the inverter 20 and the battery 54 to the greatest possible extent, with obvious benefits for the overall efficiency of the system 10.

According to another control method of the traction system 10, when the accumulator 54 has a high charging level, the control device 62 acts so as to increase the power delivered by the second power source 18. Vice versa, when the accumulator 54 has a low charging level, the control device 62 acts so as to increase the power delivered by the first power source 22 and decreases the power delivered by the second source 18. In particular, the first power source 22 may be switched off when the accumulator 54 has a high level of charge. That control method promotes minimization of the charge oscillations of the accumulator 54 with a consequent increase in the service-life thereof.

The traction system 10 succeeds in ensuring the deceleration of the vehicle without having to use dissipation mechanisms, such as, for example, brakes.

The traction system of the present invention therefore solves the problems set out with reference to the known prior art, having a large number of advantages at the same time.

These include the possibility of controlling the speed of the first member 50 of the differential 34 in an independent manner from the endothermic engine, which is usually used as the first non-reversible power source 22, so that it operates near the maximum efficiency level and level of lowest fuel consumption to the greatest possible extent. That characteristic, combined with the use of a toroidal CVT capable of reversing the motion, allows control of the traction of the vehicle in an optimum manner.

What is claimed is:

1. A toroidal friction continuous speed variation device comprising: an input friction disc connected to a first power branch; an output friction disc connected to a second power branch, and at least two roller members; the roller members having a friction surface shaped in the form of a spherical dome, wherein the contact pitch diameter between the input and output friction discs and the roller member which is positioned on the discs themselves, does not vary with the variation of the transmission ratio of the continuous speed variation device.

2. The continuous speed variation device according to claim 1, wherein the input friction disc and the output friction disc have a friction surface of toroidal shape.

3. The continuous speed variation device according to claim 1, wherein the roller members are in contact with the input friction disc and the output friction disc at contact locations located in positions opposite each other with respect to the axis of rotation of the roller member.

4. The continuous speed variation device according to claim 3, wherein the axis of rotation of the roller members is substantially perpendicular to the axis of rotation of the input and output friction discs when the continuous speed variation device has ratio of 1.

5. The continuous speed variation device according to claim 1, wherein the input and output friction discs are arranged coaxially laying on their axis of rotation, which contact locations on the roller member are at opposite positions referred to the rotation axis of the roller member and the input and output friction discs have an opposing direction of rotation relative to each other.

6. The continuous speed variation device according to claim 1, comprising at least one actuator device connected to the roller members, associated for operation with the continuous speed variation device, in such a manner that the transmission ratio between the input and the output friction discs is varied as a function of the oscillating angle of the roller member around an oscillating axis perpendicular to the axis of rotation of the input and output friction discs and simultaneously perpendicular to the axis of rotation of the roller member.

7. The continuous speed variation device according to claim 6, wherein the at least one actuator device providing torque around the oscillating axis to actuate the variation of the oscillating angle of the roller member.

8. The continuous speed variation device according to claim 1, comprising at least three roller members.

9. The continuous speed variation device according to claim 8, wherein the three roller members are arranged at 120 degrees between them.

10. The continuous speed variation device according to claim 1, wherein the input and output friction discs are capable of displacement along a radial direction.

11. The continuous speed variation device according to claim 1, further comprising an axial cam, interposed between a complementary disk and the input and output friction discs, transmitting torque between the input and output friction discs and the complementary disk wherein a preload is provided to the input and output friction discs along the axis of rotation when torque is transmitted.

12. The continuous speed variation device according to claim 11, wherein the surface of the input and output friction discs on the cross section laying on the plane defined by the contact location with the roller member and its oscillation axis, is of a convex shape and any transmission ratio of the continuous speed variation device.

13. The continuous speed variation device according to claim 1, comprising two input friction discs, two output friction discs and six roller members, arranged in a such configuration that the input and output friction discs are laying on the same rotation axis, the two input friction discs are in connection between them and rotating in the same direction and, the two output friction discs are in connection between them and rotating in an opposite direction referred to the input friction discs.

14. A continuous speed variation device comprising an input friction disc, an output friction disc, at least two roller members, input and output friction discs having a friction surface of toroidal shape and the roller members having a friction surface shaped in the form of a spherical dome wherein the axis of rotation of the roller members are configured such that they are substantially perpendicular to the axis of rotation of the input and output friction discs when the continuous speed variation device has ratio of 1 and, the contact pitch diameter between the roller member and the input and output friction discs which is positioned on the discs themselves, does not vary with the variation of the transmission ratio of the continuous speed variation device, wherein the input and output friction discs are capable of self-aligning by means of a displacement along a radial direction in order to achieve a balanced contact load against the three roller members.

15. A toroidal friction continuous speed variation device comprising:
    an input friction disc connected to a first power branch;
    an output friction disc connected to a second power branch, and
    at least two roller members, the roller members having a friction surface shaped in the form of a spherical dome, wherein the input and output friction discs are capable of displacement along a radial direction.

16. A toroidal friction continuous speed variation device comprising:
    an input friction disc connected to a first power branch;
    an output friction disc connected to a second power branch, and
    at least two roller members, the roller members having a friction surface shaped in the form of a spherical dome; and
    an axial cam, interposed between the complementary disk and the input and output friction discs, transmitting torque between the input and output friction discs and a complementary disk and wherein a preload is provided to the input and output friction discs along the axis of rotation when torque is transmitted.

17. A toroidal friction continuous speed variation device comprising:
    an input friction disc connected to a first power branch;
    an output friction disc connected to a second power branch, and
    at least two roller members, the roller members having a friction surface shaped in the form of a spherical dome; and
    two input friction discs, two output friction discs and six roller members, arranged in a such configuration that the input and output friction discs are laying on the same rotation axis, the two input friction discs are in connection between them and rotating in the same direction and, the two output friction discs are in connection between them and rotating in an opposite direction referred to the input friction discs.

* * * * *